(12) United States Patent
Hsu

(10) Patent No.: US 6,932,131 B1
(45) Date of Patent: Aug. 23, 2005

(54) TIRE REINFORCING ARRANGEMENT

(76) Inventor: Shut Chen Hsu, No. 7, Alley 1, Lane 163, Sec. 3, Nung-Chuan Rd., I Lan City (TW)

( * ) Notice: Subject to any disclaimer, the term of this patent is extended or adjusted under 35 U.S.C. 154(b) by 0 days.

(21) Appl. No.: 10/842,508

(22) Filed: May 11, 2004

(51) Int. Cl.[7] .............................................. B60C 17/04
(52) U.S. Cl. ...................................... 152/520; 152/158
(58) Field of Search .................................. 152/520, 158

(56) References Cited

U.S. PATENT DOCUMENTS

2003/0116245 A1 * 6/2003 Hsu ............................ 152/158
2003/0221757 A1 * 12/2003 Hsu ............................ 152/158
2004/0144463 A1 * 7/2004 Hsu ............................ 152/158

* cited by examiner

Primary Examiner—Adrienne C. Johnstone
(74) Attorney, Agent, or Firm—Rosenberg, Klein & Lee

(57) ABSTRACT

A tire reinforcing arrangement includes a tire and two auxiliary tires mounted inside the tire for supporting the tire in shape for running on the road when the tire is broken, each auxiliary tire being formed of a plurality of hollow auxiliary tire elements, a plurality of smoothly arched connecting plates fastened to the auxiliary tire elements at two sides with screw bolts to connect the auxiliary tire elements into a series of linked auxiliary tire elements, and two U-bars fastened together with a screw bolt and a pin and connected to the series of linked auxiliary tire elements with screw bolts and pins to join the ends of the series of linked auxiliary tire elements.

2 Claims, 8 Drawing Sheets

TIRE REINFORCING ARRANGEMENT

BACKGROUND OF THE INVENTION

1. Field of the Invention

The present invention relates to vehicle tires and, more particularly, to a tire reinforcing arrangement.

2. Description of the Related Art

Conventional vehicle tires include two types, namely, the one with inner tube and the other without inner tube. A tire with an inner tube is inflatable. When the inner tube of a tire pierced by a pointed external object, it leaks, and the driver must stop the car immediately. A sudden explosion of a tire may cause a traffic accident when the car is running on a freeway. A tubeless tire or the so-called high-speed tire does not explode when pierced by a pointed external object, giving a sufficient time to let the driver drive the car to a garage for repair. However, because a tire shows no significant tire pressure loss when a pointed external object pierced the tire, the driver may keep driving the car on a highway or freeway. In this case, an accident may occur.

Therefore, it is desirable to provide an auxiliary wheel rim for a vehicle wheel that eliminates the aforesaid problems.

SUMMARY OF THE INVENTION

The present invention has been accomplished under the circumstances in view. It is the main object of the present invention to provide a tire reinforcing arrangement, which allows the car driver to keep driving the car safety for a certain period of time upon an explosion of the tire. It is another object of the present invention to provide a tire reinforcing arrangement, which is easy to install. It is still another object of the present invention to provide a tire reinforcing arrangement, which fits tires of different sizes.

To achieve these and other objects of the present invention, the tire reinforcing arrangement comprises a tire, and two auxiliary tires mounted inside the tire for supporting the tire in shape for running on the road when the tire is broken. Each auxiliary tire is comprised of a plurality of hollow auxiliary tire elements, a plurality of smoothly arched connecting plates fastened to the auxiliary tire elements at two sides with screw bolts to connect the auxiliary tire elements into a series of linked auxiliary tire elements, and two U-bars fastened together with a screw bolt and a pin and connected to the series of linked auxiliary tire elements with screw bolts and pins to join the ends of the series of linked auxiliary tire elements.

DETAILED DESCRIPTION OF THE PREFERRED EMBODIMENT

Figure 1:
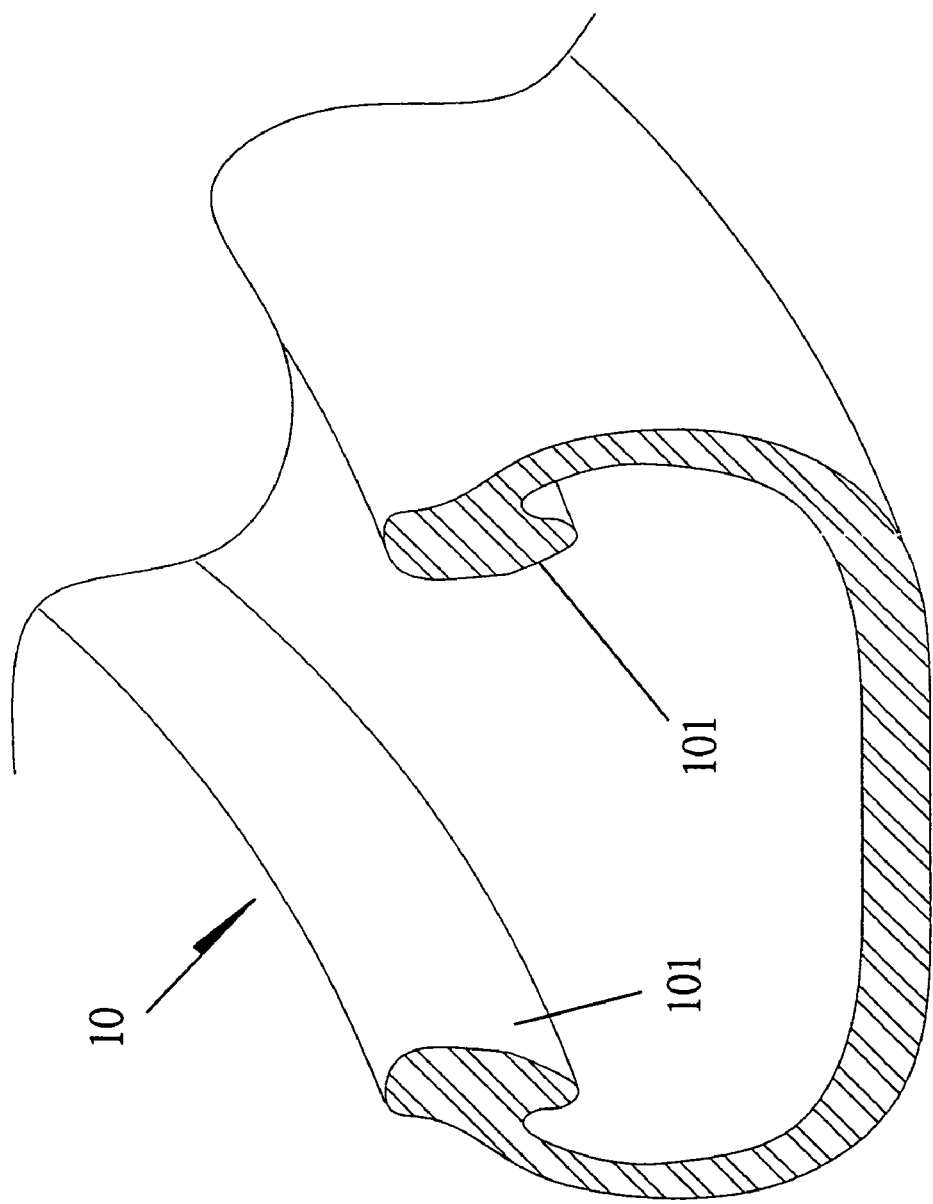
FIG. 1 is a sectional elevation of a tire according to the present invention.
Figure 2:
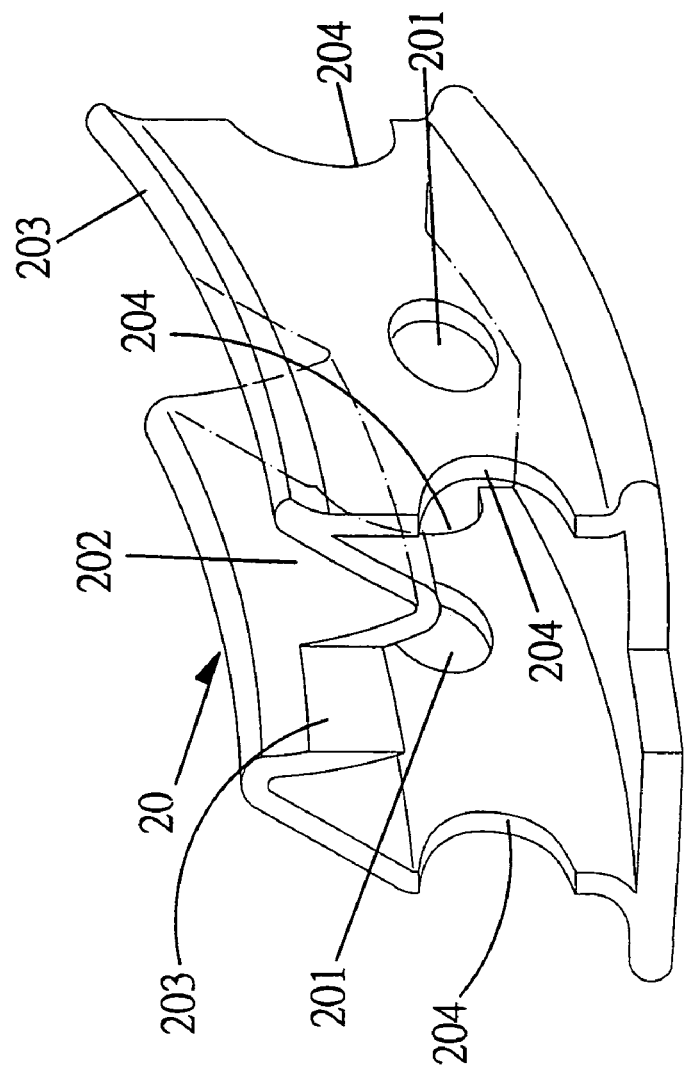
FIG. 2 is a perspective view of an auxiliary tire element according to the present invention.
Figure 2A:
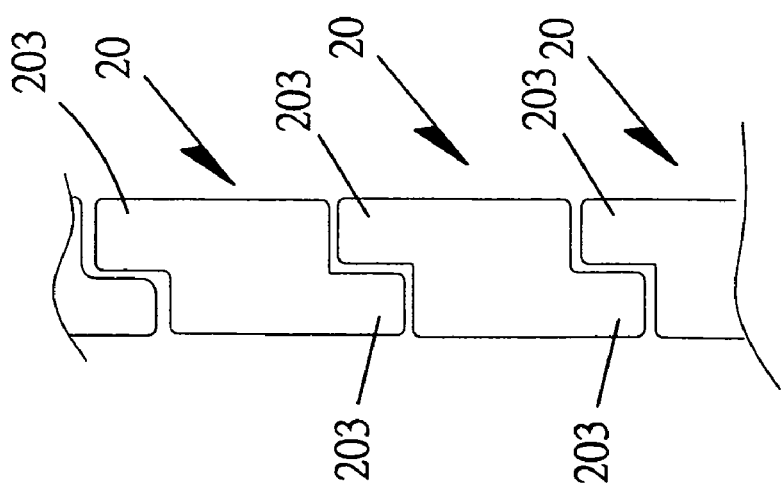
FIG. 2A is a schematic bottom view showing auxiliary tire elements connected in series.
Figure 3:
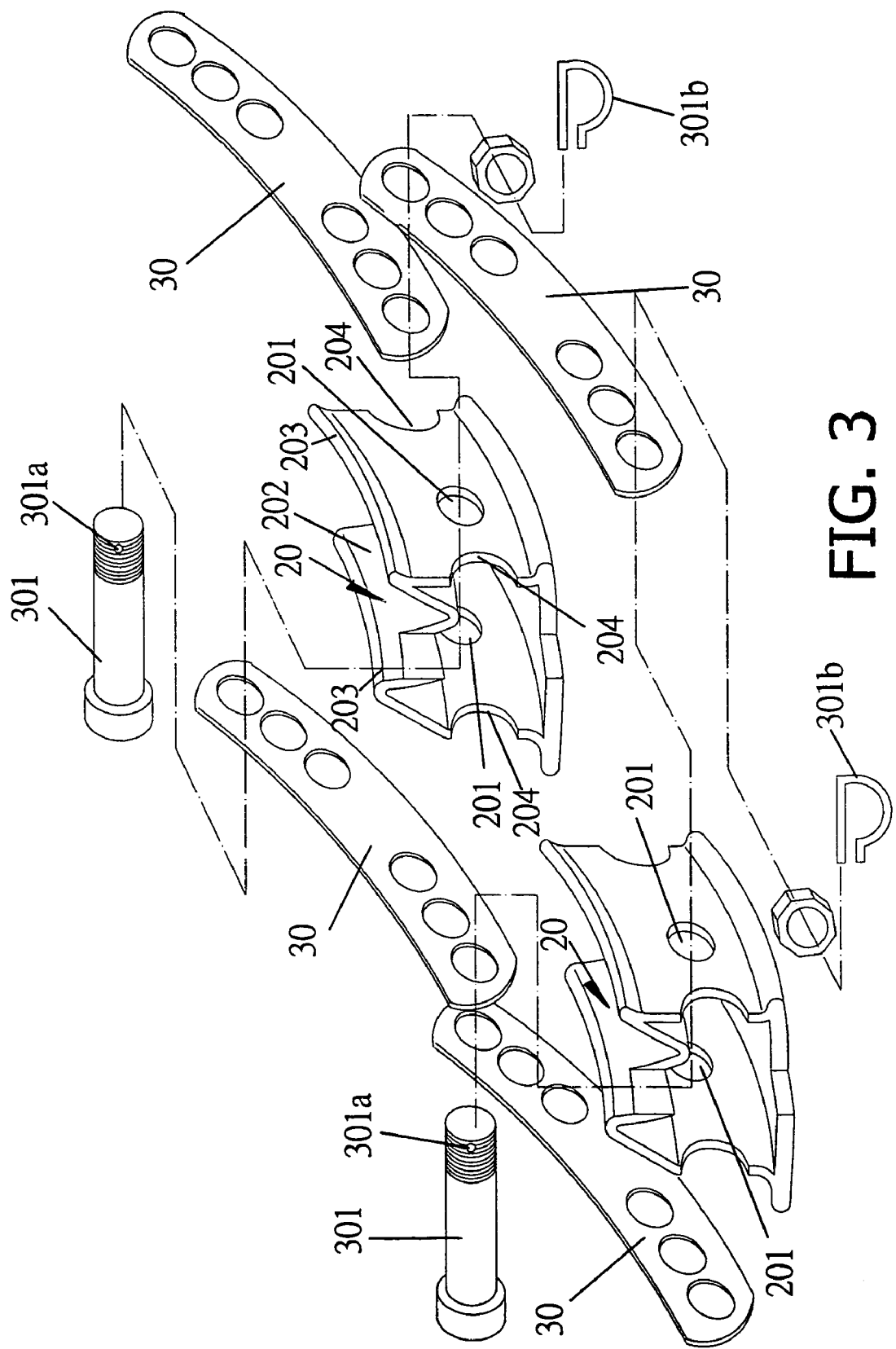
FIG. 3 is an exploded view of a part of a tire reinforcing arrangement according to the present invention.
Figure 4:
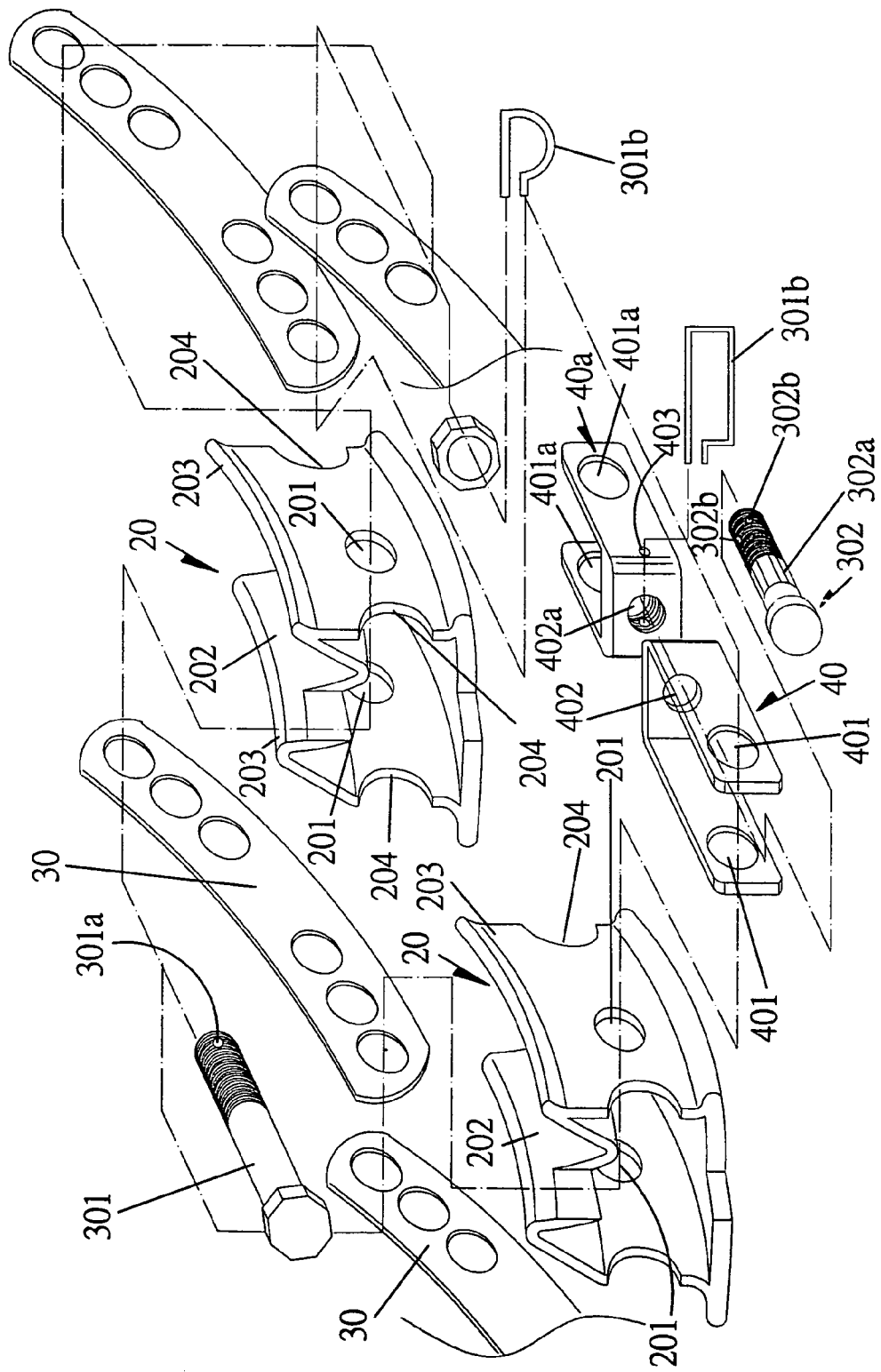
FIG. 4 is an exploded view of another part of the tire reinforcing arrangement according to the present invention.

Referring to FIG. 1, a tire 10 is shown having two retaining flanges 101 bilaterally extended along the inner diameter thereof. Further, the tire 10 has meshed reinforcing layer (not shown) embedded therein.

Referring to FIGS. 2–5, an auxiliary tire 1000 is mounted in the tire 10, and adapted to support the tire 10 for running on the road when the tire 10 is broken. The auxiliary tire 1000 is comprised of a plurality of auxiliary tire elements 20, a plurality of smoothly arched connecting plates 30, and two U-bars 40, 40a. The auxiliary tire elements 20 are hollow members each comprising two mounting holes 201 aligned at two opposite lateral sides, two top protruding edges 201 bilaterally disposed at the top, a top mounting groove 202 defined between the top protruding edges 201, and end notches 204 bilaterally symmetrically formed in the front and rear sides. First screw bolts 301 are inserted through the connecting plates 30 and the mounting holes 201 of the auxiliary tire elements 20 to connect the auxiliary tire elements 20 in series, and pins 301b are respectively fastened to a respective transverse through hole 301a of each of the first screw bolts 301 to secure the first screw bolts 301 to the connecting plates 30 and the auxiliary tire elements 20. The two U-bars 40, 40a are secured together by a second screw bolt 302 to join the ends of the series of linked auxiliary tire elements 20. The U-bars 40, 40a each comprise two end holes 401 or 401a respectively connected to the mounting holes 201 of the two auxiliary tire elements 20 at the ends of the series of linked auxiliary tire elements 20, a middle mounting hole 402 or 402a. The second U-bar 40a further comprises a pinhole 403 transversely extended through the two arms thereof. The second screw bolt 302 is inserted through the middle mounting (through) hole 402 of the fist U-bar 40 and threaded into the middle mounting (screw) hole 402a (screw hole) of the second U-bar 40a, having a polygonal shoulder 302a stopped against the inside wall of the first U-bar 40, and a plurality of transverse through holes 302b. A pin 301b is inserted through the pinhole 403 of the second U-bar 40a and one transverse through hole 302b of the second screw bolt 302 to secure the second screw bolt 302 to the U-bars 40, 40a.

Figure 6:
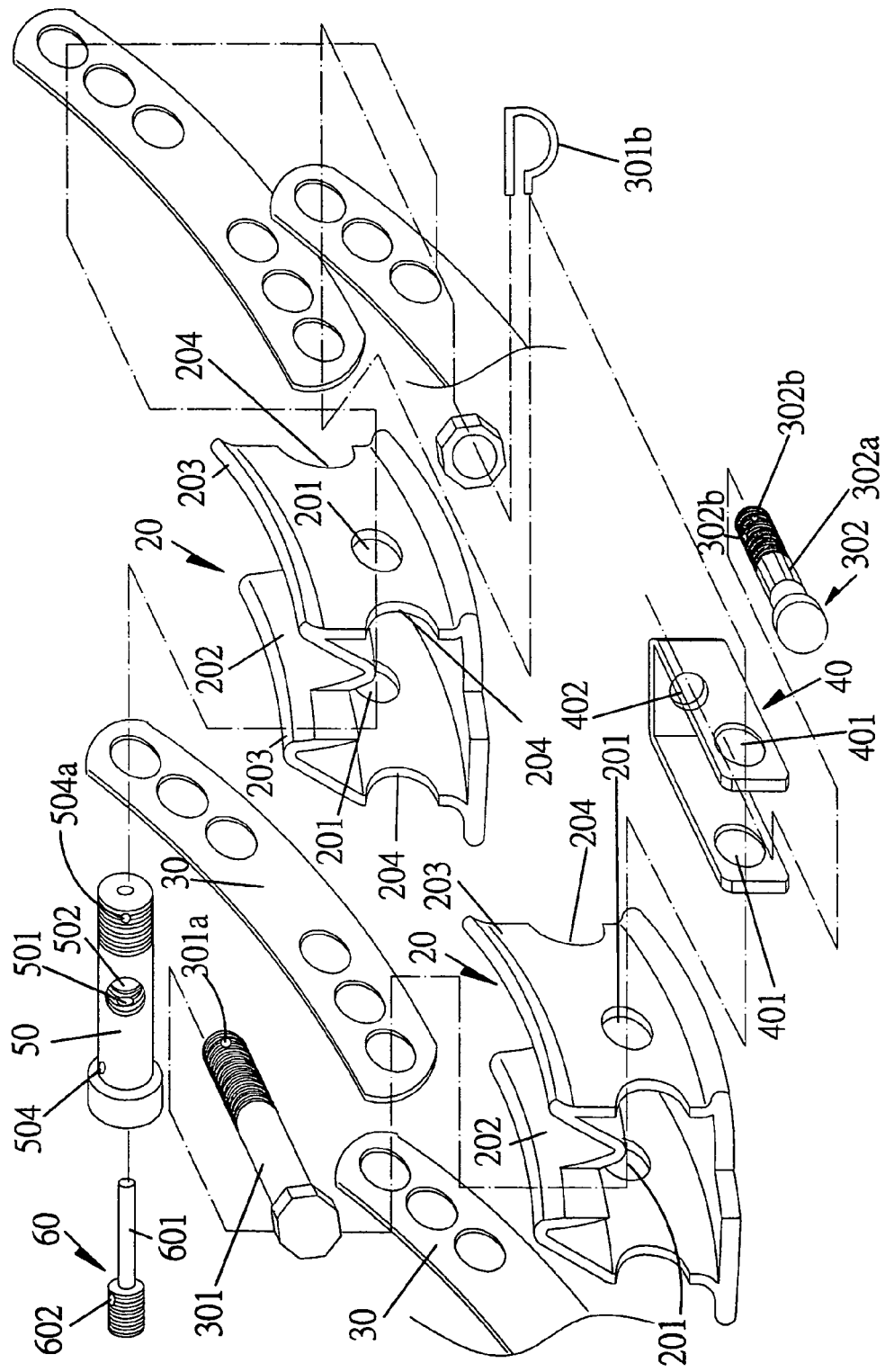
FIG. 6 is an exploded view of an alternate form of the present invention.
Figure 7:
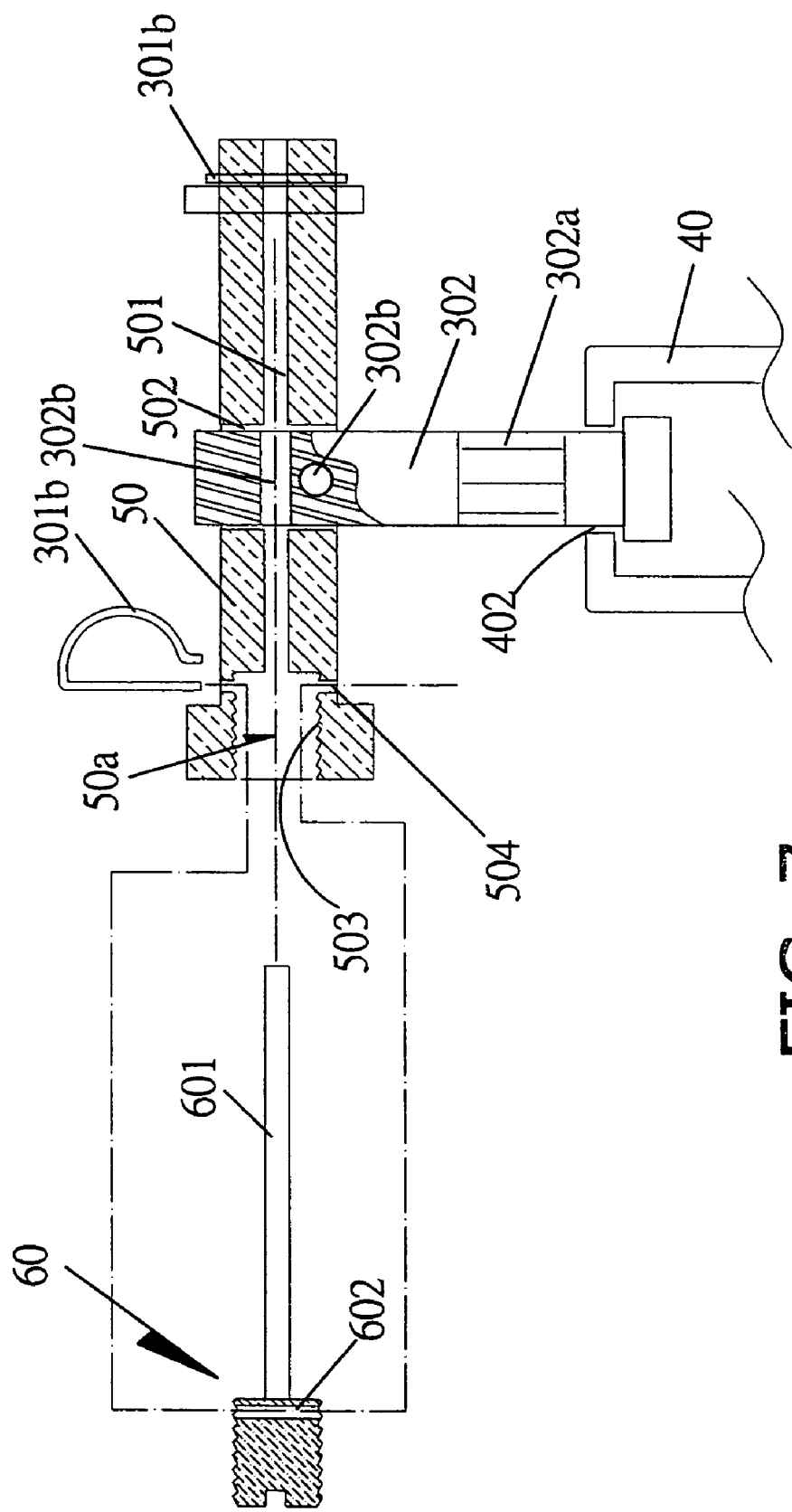
FIG. 7 is a sectional view of a part of the alternate form of the present invention.

FIGS. 6 and 7 show an alternate form of the present invention. According to this embodiment, one U-bar 40, one locating bolt 50 and one locating pin 60 are used with the second screw bolt 302 to join the ends of the series of linked auxiliary tire elements 20. The U-bar 40 has two end holes 401 connected to the mounting holes 201 of the auxiliary tire element 20 at one end of the series of linked auxiliary tire elements 20, and a middle mounting hole 402. The locating bolt 50 is inserted through the mounting holes 201 of the auxiliary tire element 20 at the other end of the series of linked auxiliary tire elements 20, having an axial through hole 501 axially extended through the two distal ends thereof, an end screw hole 503 at one end of the axial through hole 501, a transverse screw hole 502 extended across the axial through hole 501 on the middle, a first transverse pinhole 504 extended across the end screw hole 503, and second transverse pin hole 504a disposed near one end remote from the end screw hole 503. The second screw bolt 302 is inserted through the middle mounting hole 402 of the U-bar 40 and threaded into the transverse screw hole 502 of the locating bolt 50, having a polygonal shoulder 302a stopped against the inside wall of the U-bar 40, and a plurality of transverse through holes 302b. The locating pin 60 has a threaded head 602 threaded into the end screw hole 503 of the locating bolt 50, and a pin body 601 extended from one side of the threaded head 602 and inserted through the axial through hole 501 of the locating bolt 50 and one transverse through holes 302b of the second screw bolt 302. Further two pins 301b are respectively mounted in the first transverse pinhole 504 and second transverse pinhole 504a of the locating bolt 50.

Figure 5:
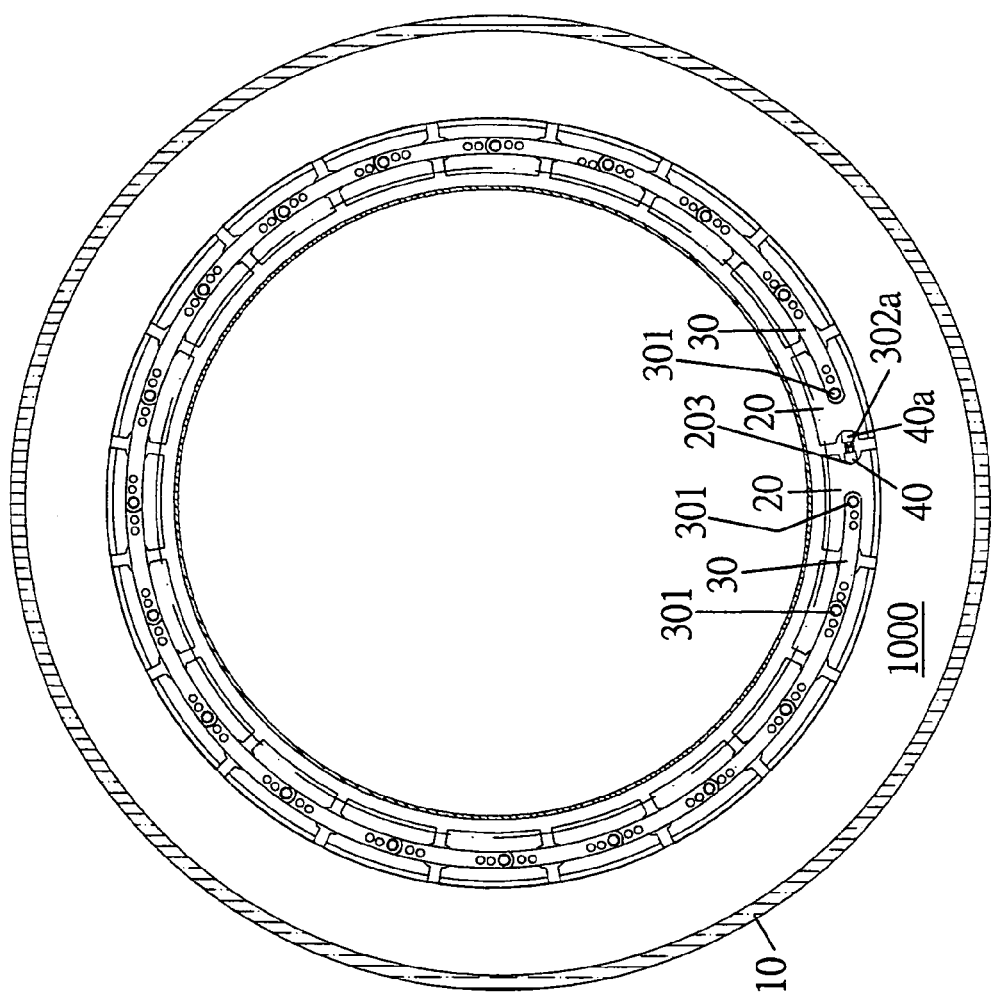
FIG. 5 is a sectional view showing the tire reinforcing arrangement installed according to the present invention.
Figure 8:
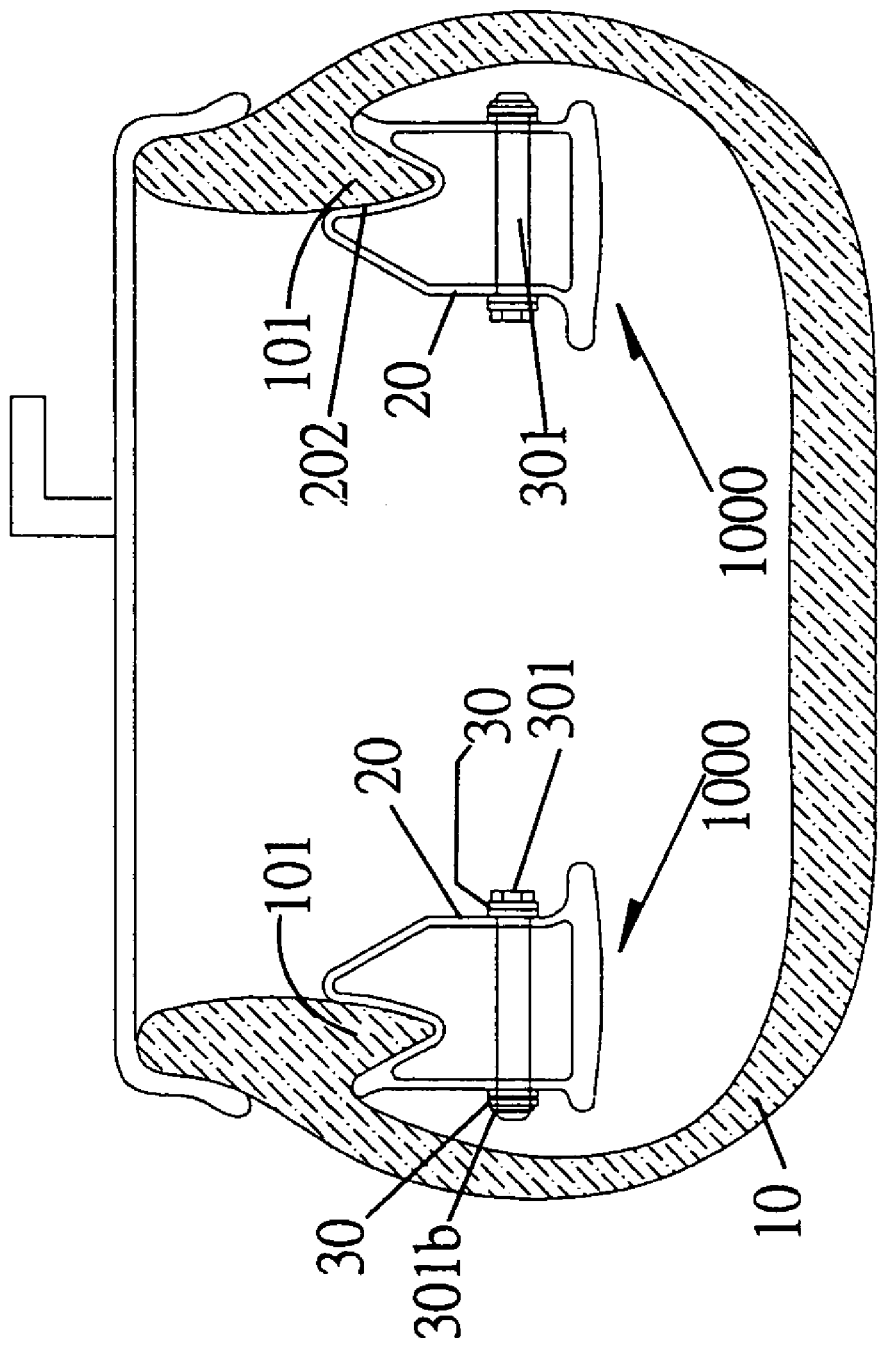
FIG. 8 is a sectional view showing two auxiliary tires installed in a tire according to the present invention.

Referring to FIGS. 5 and 8, two auxiliary tires 1000 are mounted in the tire 10 by forcing the top mounting grooves 202 of the auxiliary tire elements 20 into engagement with the retaining flanges 101 of the tire 10.

If the tire 10 is broken during running, the auxiliary tires 1000 support the wheel for running on the road, enabling the driver to drive the car to a repair shop safely for further repair.

A prototype of tire reinforcing arrangement has been constructed with the features of FIGS. 1~8. The tire reinforcing arrangement functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A tire reinforcing arrangement comprising a tire, said tire having two retaining flanges bilaterally extended along the inner diameter thereof, and two auxiliary tires mounted inside said tire and respectively fastened to the retaining flanges of said tire, wherein each said auxiliary tire comprising:

a plurality of auxiliary tire elements, said auxiliary tire elements each comprising two mounting holes aligned at two opposite lateral sides thereof, two top protruding edges bilaterally disposed at a top side thereof, a top mounting groove defined between said top protruding edges and coupled to one retaining flange of said tire, and a plurality of end notches bilaterally symmetrically formed in front and rear sides thereof;

a plurality of smoothly arched connecting plates respectively fastened to said auxiliary tire elements at two sides to connect said auxiliary tire elements into a series of linked auxiliary tire elements, said smoothly arched connecting plates each having two distal ends respectively connected to two of said auxiliary tire elements;

a plurality of first screw bolts respectively inserted through said smoothly arched connecting plates and the mounting holes of said auxiliary tire elements to fasten said smoothly arched connecting plates to said auxiliary tire elements, said first screw bolts each having a rear end and a transverse pinhole transversely extended through the rear end;

a plurality of first pins respectively fastened to the transverse pinhole of each said first screw bolt to secure said first screw bolts to said auxiliary tire elements and said smoothly arched connecting plates;

a first U-bar and a second U-bar secured together to join the ends of said series of linked auxiliary tire elements, said first U-bar comprising two end holes for connection to the mounting holes of one said auxiliary tire element at a first end of said series of linked auxiliary tire elements and a middle mounting hole, said second U-bar having two end holes for connection to the mounting holes of one said auxiliary tire element at a second end of said series of linked auxiliary tire elements, a middle screw hole, and a pinhole transversely extended through two arms thereof;

a second screw bolt inserted through the middle mounting hole of said fist U-bar and threaded into the middle screw hole of said second U-bar to fasten said first U-bar and said second U-bar together, said second screw bolt having a polygonal shoulder stopped against an inside wall of said first U-bar, and a plurality of transverse through hole; and a second pin inserted through the pinhole of said second U-bar and one transverse through hole of said second screw bolt to secure said second screw bolt to said first U-bar and said second U-bar.

2. A tire reinforcing arrangement comprising a tire, said tire having two retaining flanges bilaterally extended along the inner diameter thereof, and two auxiliary tires mounted inside said tire and respectively fastened to the retaining flanges of said tire, wherein each said auxiliary tire comprising:

a plurality of auxiliary tire elements, said auxiliary tire elements each comprising two mounting holes aligned at two opposite lateral sides thereof, two top protruding edges bilaterally disposed at a top side thereof, a top mounting groove defined between said top protruding edges and coupled to one retaining flange of said tire, and a plurality of end notches bilaterally symmetrically formed in front and rear sides thereof;

a plurality of smoothly arched connecting plates respectively fastened to said auxiliary tire elements at two sides to connect said auxiliary tire elements into a series of linked auxiliary tire elements, said smoothly arched connecting plates each having two distal ends respectively connected to two of said auxiliary tire elements;

a plurality of first screw bolts respectively inserted through said smoothly arched connecting plates and the mounting holes of said auxiliary tire elements to fasten said smoothly arched connecting plates to said auxiliary tire elements, said first screw bolts each having a rear end and a transverse pinhole transversely extended through the rear end;

a plurality of first pins respectively fastened to the transverse pinhole of each said first screw bolt to secure said first screw bolts to said auxiliary tire elements and said smoothly arched connecting plates;

a U-bar, said U-bar comprising two end holes for connection to the mounting holes of one said auxiliary tire element at a first end of said series of linked auxiliary tire elements and a middle mounting hole;

a second screw bolt inserted through the mounting holes of one said auxiliary tire element at a second end of said series of linked auxiliary tire elements, said second screw bolt comprising an axial through hole axially extended through first and second ends thereof, an end screw hole formed in the first end at one end of said axial through hole, a transverse screw hole extended across said axial through hole on the middle, a first transverse pinhole extended across said end screw hole, and second transverse pin hole disposed near the second end remote from said end screw hole;

a third screw bolt inserted through the middle mounting hole of said U-bar and threaded into the transverse screw hole of said second screw bolt to secure said U-bar to said second screw bolt, said third screw bolt having a polygonal shoulder stopped against an inside wall of said U-bar, and a plurality of transverse through hole;

a second pin, said second pin having a threaded head threaded into the end screw hole of said second screw bolt, and a pin body extended from one side of said threaded head and inserted through the axial through hole of said second screw bolt and one transverse through holes of said third screw bolt; and two third pins respectively mounted in the first transverse pinhole and second transverse pinhole of said second screw bolt.

* * * * *